US005656106A

United States Patent [19]
Amateau et al.

[11] Patent Number: 5,656,106
[45] Date of Patent: Aug. 12, 1997

[54] APPARATUS AND METHOD FOR NET SHAPE FINISHING OF GEARS

[75] Inventors: Maurice F. Amateau; G. Dwayne Kidwell; Nagesh Sonti, all of State College, Pa.

[73] Assignee: The Penn State Research Foundation, University Park, Pa.

[21] Appl. No.: 360,506

[22] Filed: Dec. 21, 1994

Related U.S. Application Data

[62] Division of Ser. No. 6,901, Jan. 21, 1993, Pat. No. 5,391,862, which is a division of Ser. No. 829,187, Jan. 31, 1992, Pat. No. 5,221,513.

[51] Int. Cl.$^6$ ..................................................... C21D 9/32
[52] U.S. Cl. .................... 148/586; 148/654; 148/511; 148/673; 148/658; 266/118; 266/125; 266/87
[58] Field of Search ............................... 148/586, 654, 148/511, 573, 658; 266/118, 125, 87

[56] References Cited

U.S. PATENT DOCUMENTS

| 4,373,973 | 2/1983 | Cellitti et al. | 148/573 |
| 5,373,143 | 12/1994 | Pfaffmann | 148/573 |

FOREIGN PATENT DOCUMENTS

| 406122925 | 5/1994 | Japan | 148/573 |

OTHER PUBLICATIONS

The Making, Shaping and Treating of Steel, 1960 pp.1060–1061.

Primary Examiner—Deborah Yee
Attorney, Agent, or Firm—Thomas J. Monahan

[57] ABSTRACT

An apparatus is disclosed for performing thermomechanical processing of gears in which precise control of the thermal, metallurgical and mechanical action during the forming process is maintained. The apparatus comprises an induction heating system which reaustenitizes the surface of the gear with minimum decarburization, a material transfer system which provides timely operations on the work piece, tooling and fixture adjustments which provide accurate initial conditions for forming, and a process control architecture that provides the precise sequence and timing necessary to achieve metallurgically sound and dimensionally accurate gears. The induction heating cycle can be controlled from the peak, average or minimum gear surface temperature detected with a high response optical pyrometer. An inert environment is maintained around the workpiece during the induction heating and transfer to quenching above the $M_s$ temperature. Both through-feed and in-feed motion are simultaneously controlled by load, position and velocity transducers which provide feedback information to a supervising microprocessor. This apparatus produces metallurgically sound and accurate gears.

43 Claims, 11 Drawing Sheets

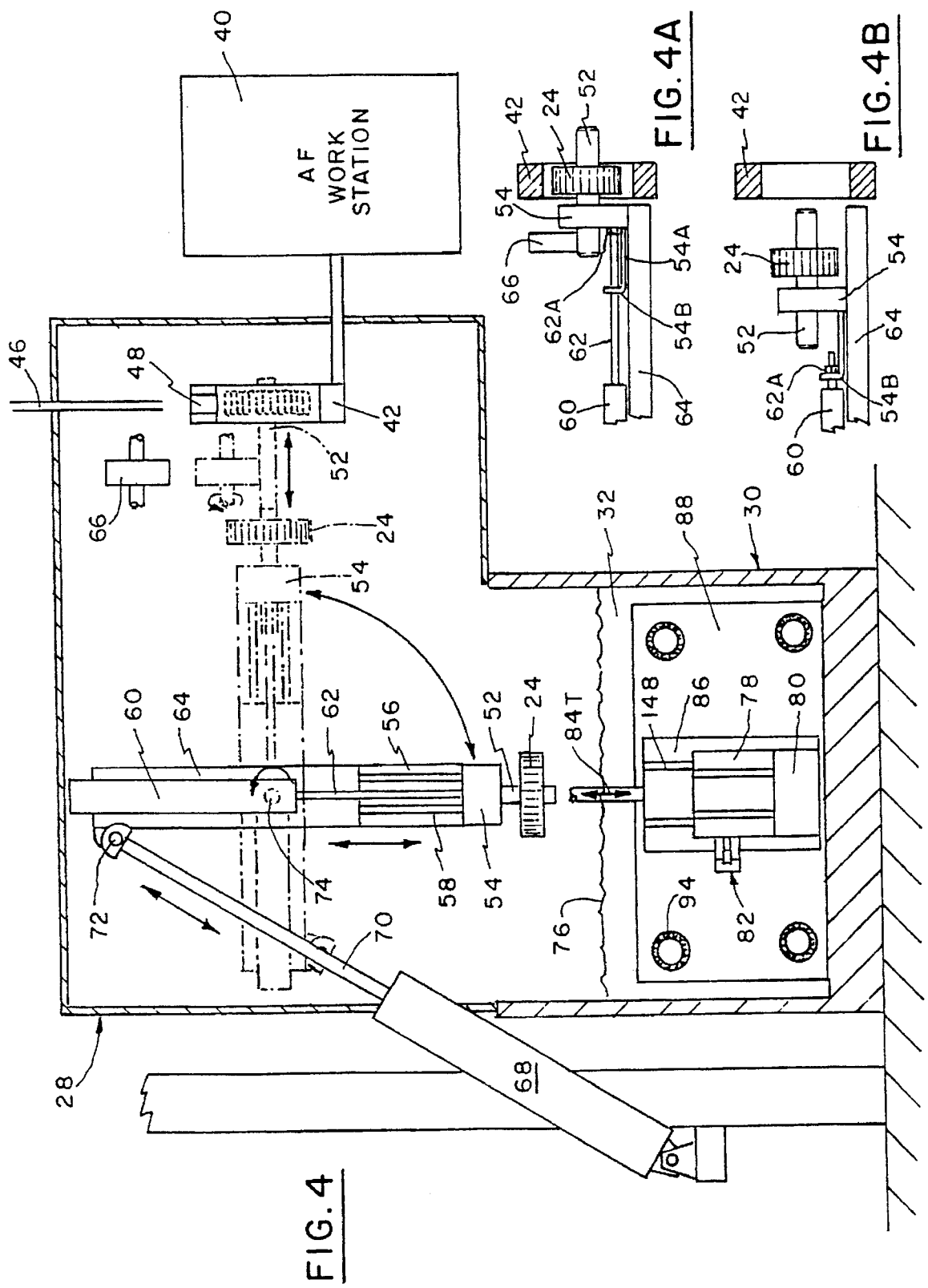

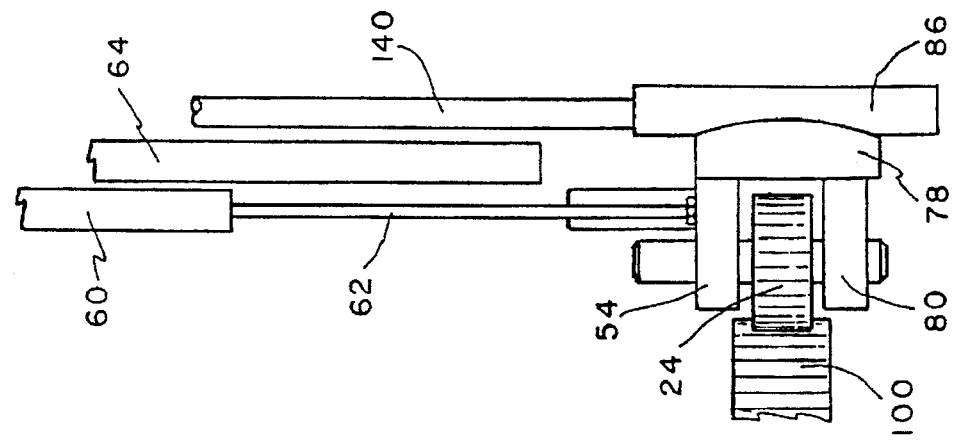
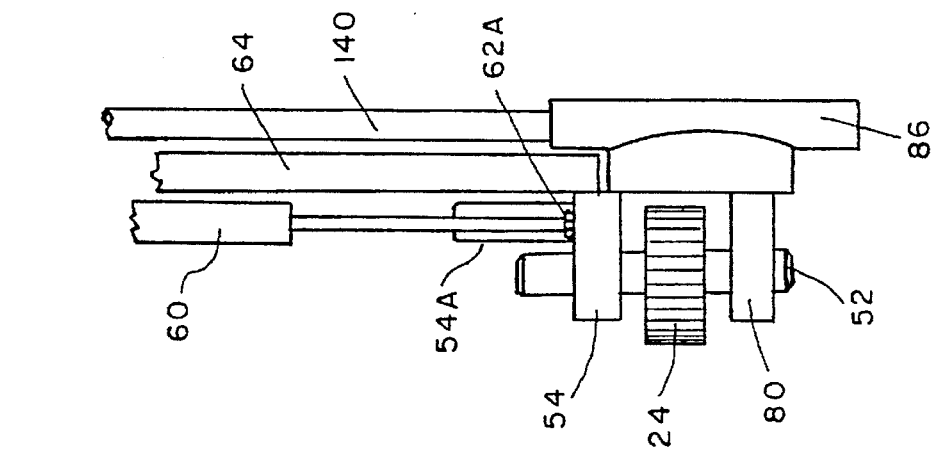
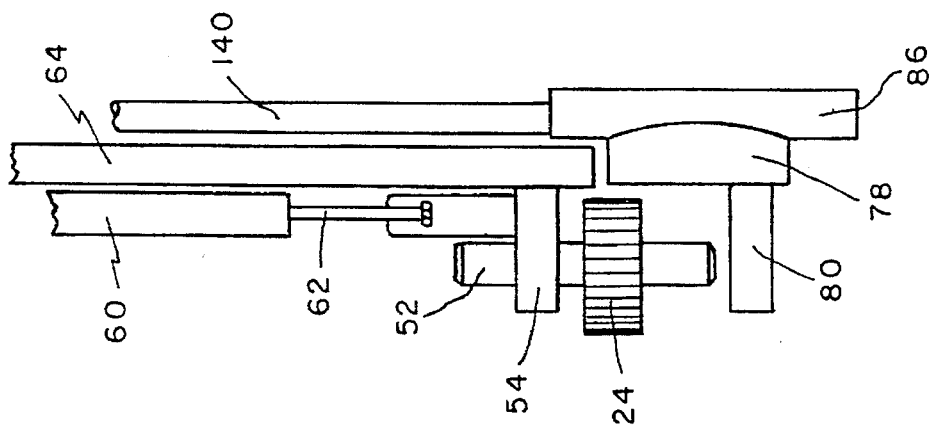
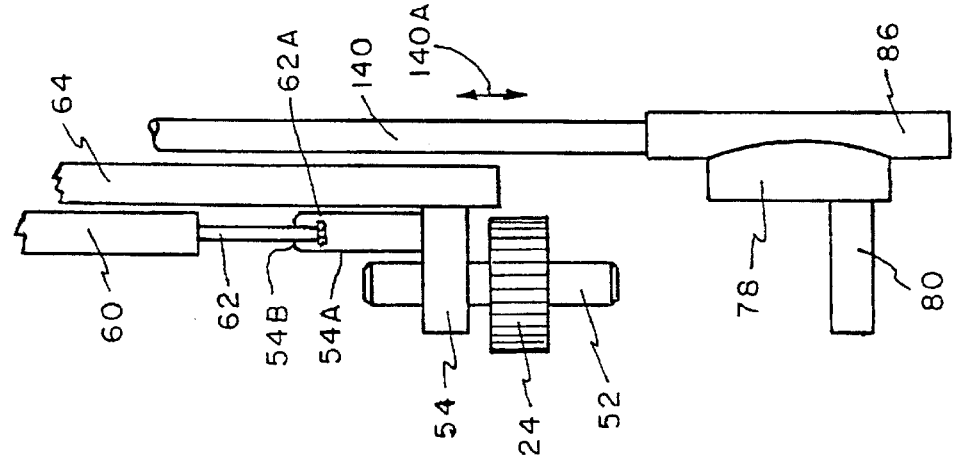

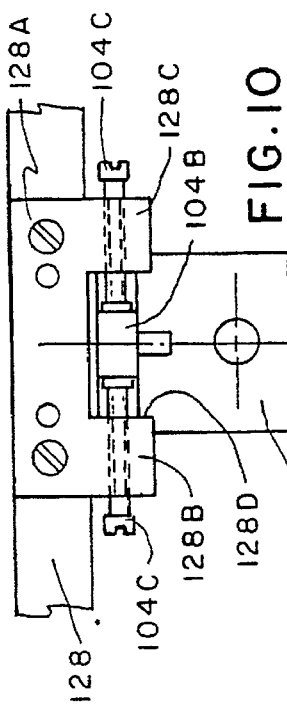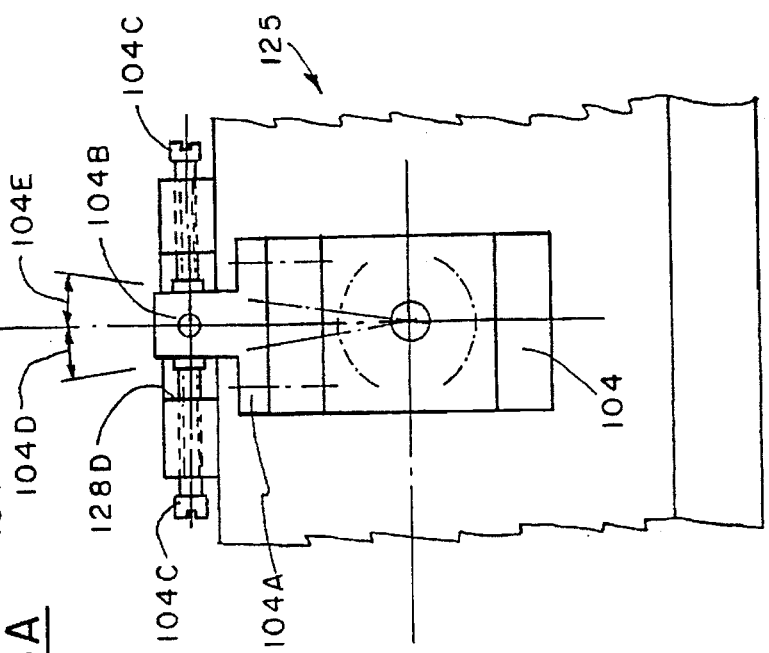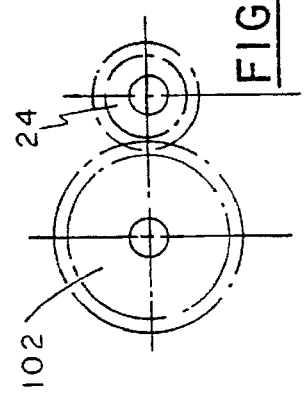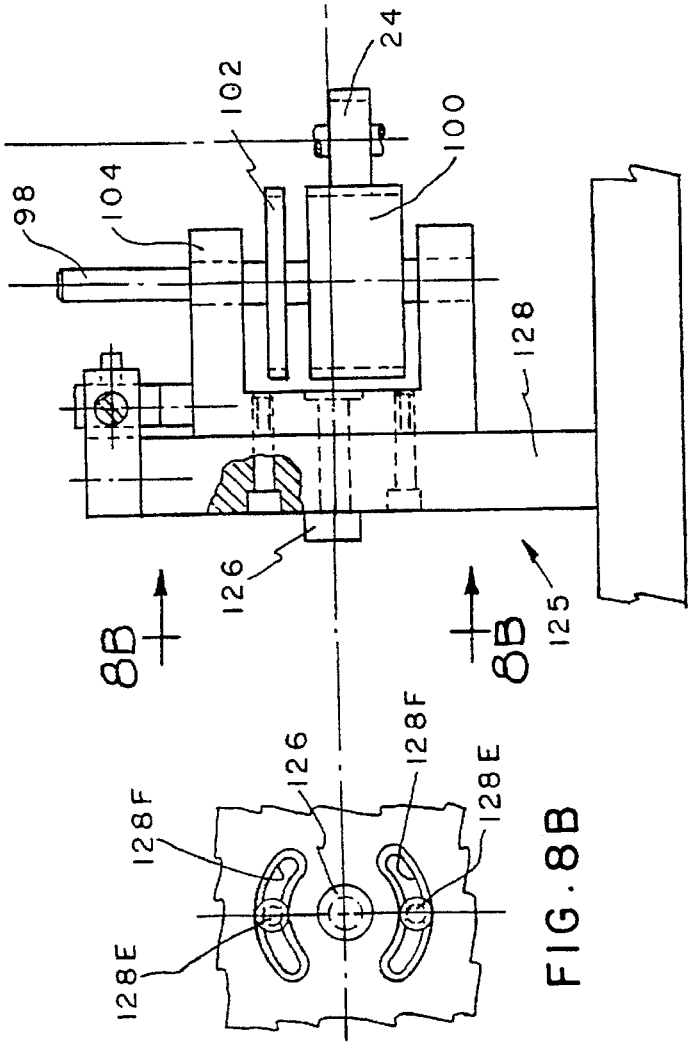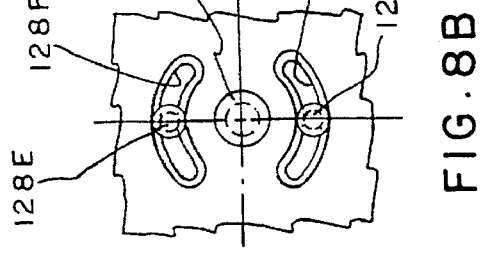

APPARATUS AND METHOD FOR NET SHAPE FINISHING OF GEARS

This is a divisional of application Ser. No. 08/006,901 filed on Jan. 21, 1993, now U.S. Pat. No. 5,391,862 which is a divisional of Ser. No. 07/829,187, now U.S. Pat. No. 5,221,513.

GOVERNMENT SPONSORSHIP

This invention was made with Government support under Contract N00039-88-C-0051 awarded by the U.S. Department of the Navy. The Government has certain rights in the invention.

BACKGROUND OF THE INVENTION

1. Field of the Invention

This invention relates to an apparatus for metallurgically treating steel gears by thermomechanical means to produce high strength and accurate contact surfaces through a net shape finishing process.

2. Description of the Prior Art

Highly loaded precision gears are normally manufactured by carburizing the surface of low carbon steel gears and reaustenitizing the entire gear prior to hardening by rapid quenching to below the temperature at which the diffusionless transformation process that creates the hardened martensitic structure proceeds to completion, the so-called $M_f$ temperature. For medium to high carbon steel gears only the surface of the gears are reaustenitized prior to quenching to produce the hardened martensitic structure. The hardened gears are then finished to net shape by grinding, skiving or other hard finishing operations. A method has been proposed in U.S. Pat. No. 4,373,973 in which a carburized gear is reaustenitized and quenched to above the start of the martensite transformation temperature, the so-called $M_s$ temperature, rolled and then quenched to martensite before any diffusional decomposition can form from the metastable austenite. This invention includes light cold-working or burnishing to complete the transformation of remaining austenite. However, no specific process details are described that produce the required metallurgical state for through-hardened, medium- or high-carbon steel gears. Nor does that disclosure describe a specific apparatus which can accomplish this process.

In reducing the concept of U.S. Pat. No. 4,373,973 to practice, we have discovered that certain critical basic issues must be addressed for a metallurgically sound and dimensionally accurate gear to be produced. To achieve metallurgically sound structures, the surface decarburization and attending oxide network characteristic of gas carburizing must be significantly reduced or eliminated. This is because, unlike conventional gear finishing, the outermost surface layers are not removed during the final finishing operation. Metallurgically sound gears also have retained austenite levels of less than 10 percent. Retained austenite is particularly prevalent with high carbon or high hardenability steel compositions. Highly accurate gear teeth require very precise control of the deformation process to minimize root slivers, lead direction errors, and profile direction errors. The present invention includes apparatus and methods to control both metallurgical quality and dimensional accuracy during thermomechanical gear finishing to produce the quality required of precision gears.

Gear finishing by rolling uses two types of motion: (1) in-feed motion in which the axes of the workpiece and the die are brought together to a fixed position to engage the mesh of each to accomplish the deformation process and (2) through-feed motion in which the axes are translated parallel to each other after meshing or synchronization at a fixed distance of separation. In conventional cold rolling operations either one or other method is used. In-feed motion is used primarily for helical gears in which there is no way to compensate for tooth-to-tooth dimensional variations. Through-feed motion is required for spur gears but conventional gear finishing machines do not compensate for dimensional variations along the lead direction. In order to successfully accomplish thermomechanical finishing by rolling, both processes must be used simultaneously and very accurate coordination between the two motions must be maintained to compensate for tooth-to-tooth and lead variations. As a prerequisite for precise control of the rolling die and workpiece during processing, the initial fixed setting must also be precisely controlled. For instance, axial out-of-plane misalignment between the workpiece and tool can produce lead errors. In-plane misalignment between workpiece and tool can lead to profile errors, a non-uniform profile contour along the lead direction, as well as lead errors.

Therefore, to produce gears by thermomechanical processing which possess desirable metallurgical properties and dimensional accuracy, it is necessary to maintain precise control over the environment, thermal conditions and mechanical actions.

SUMMARY OF THE INVENTION

In accordance with the present invention there is provided an apparatus that performs thermomechanical processing of gears in which precise control of the thermal conditions, the environment and mechanical actions during the forming process is maintained.

The essence of this invention are the process control methods and architecture for accomplishing the precision motions, the thermal control, and the environmental control using a unique combination of sensors, mechanisms, and software.

The control architecture for the mechanical movements comprises absolute position control and load control of the through-feed motion and absolute position, high resolution relative position and load control of the in-feed motion. Appropriate transducers and sensors are used to monitor each of these motions and loads and the signals from them are used as feedback signals for generating the error signal used in the servo controlled actuators for in-feed and through-feed motion. An optical pyrometer based on infrared detection is used to monitor the temperature of the gear as it is being heated by an AF induction field. During this heating the workpiece is rotated at 100 RPM to distribute the heat uniformly around the circumference of the gear. IR radiation from the gear passes through a fiber optic link to an IR detector, generating a signal which is processed by a rapid response signal processor so that the instantaneous temperature on each tooth and on each portion of the tooth such as top, flank and root can be monitored. This temperature signal is passed continuously to a high speed digital/analog interface for transmission to a supervising microprocessor. The peak, mean and minimum values of tooth-to-tooth temperatures are then used in the control logic for controlling the process. The thermal history during induction heating is also recorded for off-line analysis.

When the thermal criteria have been met, the microprocessor then transmits the command signals to deenergize the induction coil and to proceed with the next step of the process. The material handling mechanism then rapidly transfers the workpiece to a thermally controlled liquid working medium for quenching to the deformation temperature. After the workpiece has reached the deformation temperature, it is worked to its final dimension by combined in-feed and through-feed motion. Precise control of the operation is accomplished by the use of a pressure sensor in the line supplying hydraulic flow to a rotary hydraulic motor powering the rolling die. Variation in the pressure of the rotary hydraulic motor is detected when tight mesh between the workpiece and the die occurs. A signal generated from this detection is used as a logic value to establish the starting position for control of the deformation process. The in-feed motion is controlled from a signal from a high resolution displacement transducer which can measure displacements as fine as 0.0001 inch. The processing parameters are specified using a command generating software and are eventually downloaded to a supervising computer. A sequence generator allows the operator to program the operation with a series of two character commands but has built in checks to prevent operation that can inflict damage on either the workpiece or any part of the apparatus.

The region above the working medium fluid in which the gear is induction heated and subsequently manipulated prior to quenching is maintained in a nitrogen or argon environment. This feature minimizes unwanted oxidation and decarburization that can occur during this portion of the process.

Other and further features, advantages, and benefits of the invention will become apparent in the course of the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 4 is a diagrammatic end elevation view of the apparatus illustrated in FIG. 2;

FIGS. 4A and 4B are detail diagrammatic views illustrating, respectively, two successive positions of components generally illustrated in FIG. 4;

FIGS. 4G, 4H, 4I and 4J are detail diagrammatic side elevation views illustrating successive positions of parts illustrated in FIG. 4D;

FIG. 8 is a side elevation view of an out-of-plane adjustment mechanism used for purposes of the invention;

FIG. 8A is a detail top plan view merely illustrating the outline of two components illustrated in FIG. 8;

FIG. 8B is a detail elevation view taken along lines 8B—8B in FIG. 8;

FIG. 9 is a front elevation view of the mechanism illustrated in FIG. 8;

FIG. 10 is a top plan view of the mechanism illustrated in FIGS. 8 and 9;

DESCRIPTION OF THE PREFERRED EMBODIMENT

Figure 1:
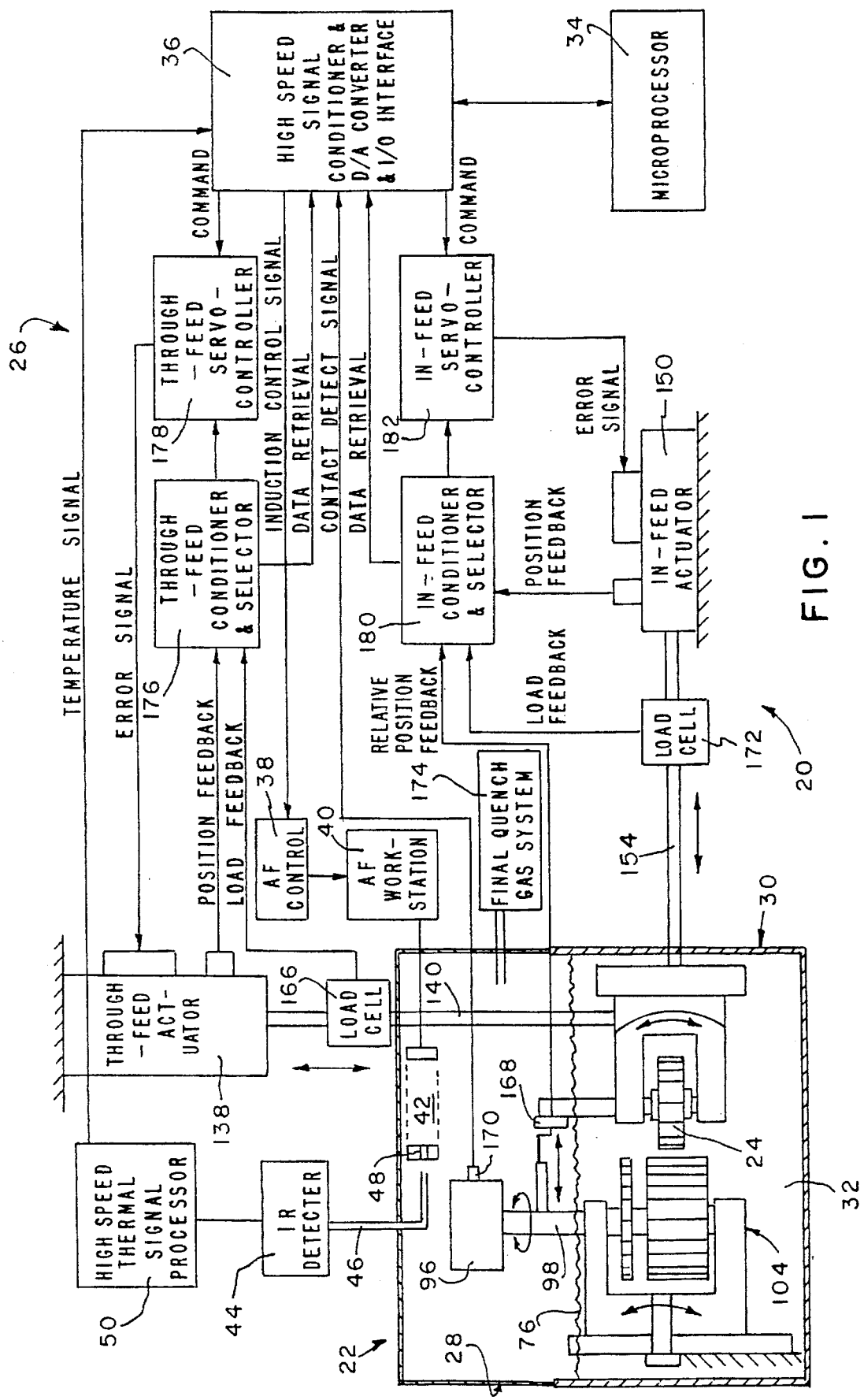
FIG. 1 is an overall schematic diagram of the essential control architecture required to achieve successful thermomechanical processing in accordance with the invention.

FIG. 1 illustrates diagrammatically and schematically a preferred system 20 for performing thermomechanical processing of gears in accordance with the present invention.

Figure 3:
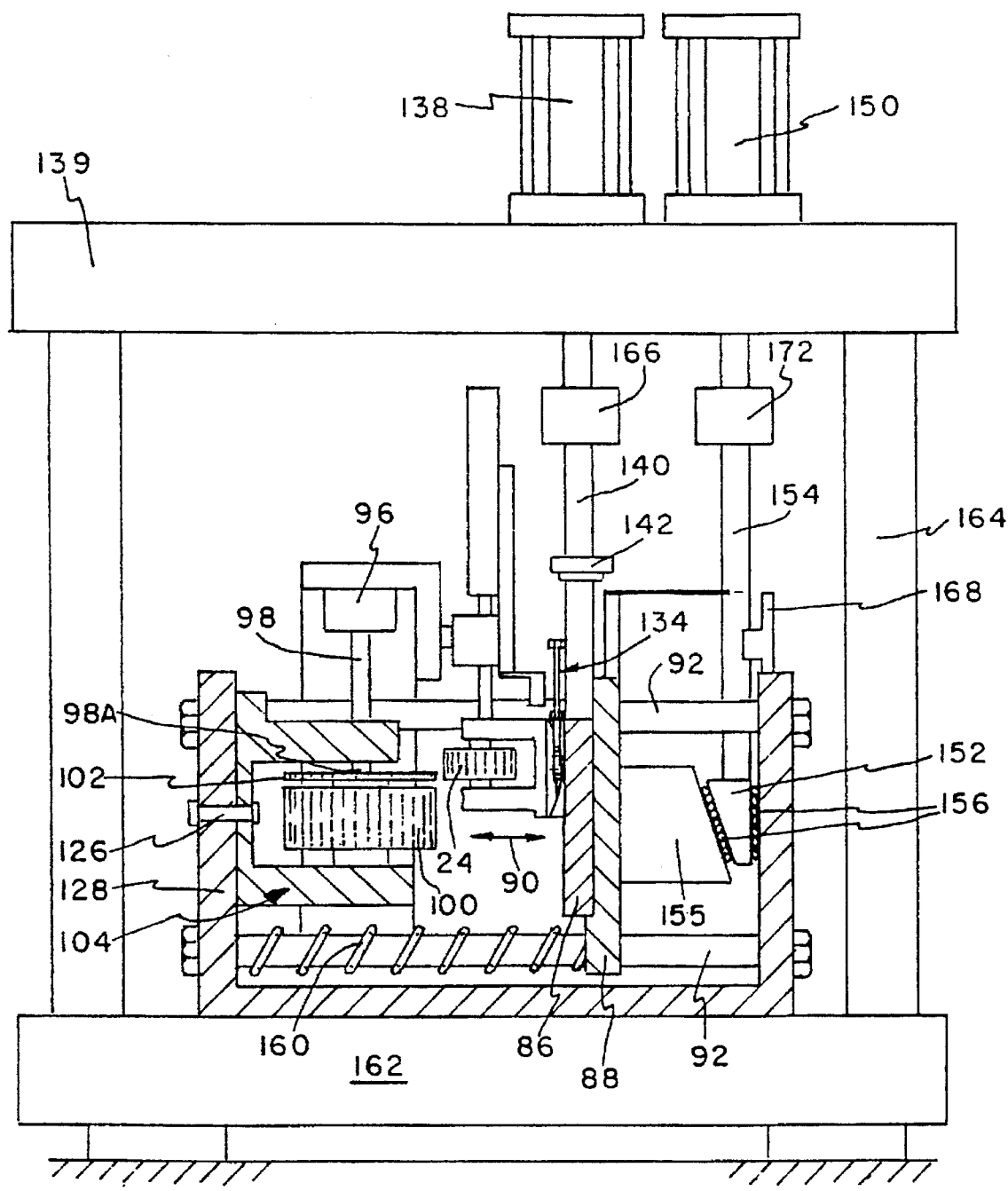
FIG. 3 is a diagrammatic side elevation view of apparatus for gear processing as embodied by the invention.

The invention can be considered as having two subsystems: a gear processing subsystem 22 by means of which the thermomechanical processes including heating and deformation are applied to perform the net shape processing of a workpiece 24 and a control subsystem 26 which provides for logic sequence and timing that are critical for the successful operation of the invention. As seen diagrammatically in FIGS. 3 and 4, the thermomechanical subsystem 22 is contained in an enclosed compartment 28 providing an inert gas environment for the heating and final quenching of the workpiece 24. A vessel 30 in a sealed relationship with the compartment 28 contains a liquid working medium 32 which may be a commercially available marquenching oil. The workpiece is rapidly immersed in the liquid medium. 32 thereby quenching it to the thermomechanical processing temperature of the metastable austenite in which net shape forming is performed. This stage of the process is referred to, metallurgically, as ausforming.

The workpiece 24 is referred to initially as a "near net shaped gear blank" and when all processes of the invention have been completed, it is referred to as a "net shaped gear". As a near net shaped gear blank, it may have been hobbed or otherwise formed using conventional techniques. As such, for purposes of the invention, the workpiece 24 is formed with its gear teeth approximately 0.001 to 0.002 inches oversized in tooth thickness relative to the final or desired size so that the gear can meet the dimensional tolerances of AGMA required for high performance gears without the necessity of grinding. The displacement of the metal during the deforming operations performed in accordance with the invention serves to remove the excess tooth thickness while assuring the proper profile. Grinding is eliminated, and for this reason alone there can be as much as a 70% increase in surface durability at any given contact stress level.

High strength gears are generally fabricated from a low carbon alloy carburizing grade steel in which the surface and sub-surface regions have been enriched with carbon to a specified depth. The higher carbon content serves to increase the hardness and to strengthen the material along the gear contacting teeth surfaces and beneath the surface. The elevation in hardness results from transformation of the steel from the face centered cubic crystal structure known as austenite to the body centered tetragonal crystal structure of very fine grain size known as martensite. Less hard but tougher properties can be obtained by isothermal transformation to bainite or a mixture of bainite and martensite upon quenching.

In a conventional gear processing method, the workpiece is quenched rapidly through the austenitic region by immersion into quenching media below the $M_s$ temperature. The workpiece is subsequently tempered at a designated temperature to soften the structure and impart ductility. After the tempering treatment is complete, gear finishing is accomplished by grinding in a well known manner for high performance gears.

Figure 2:
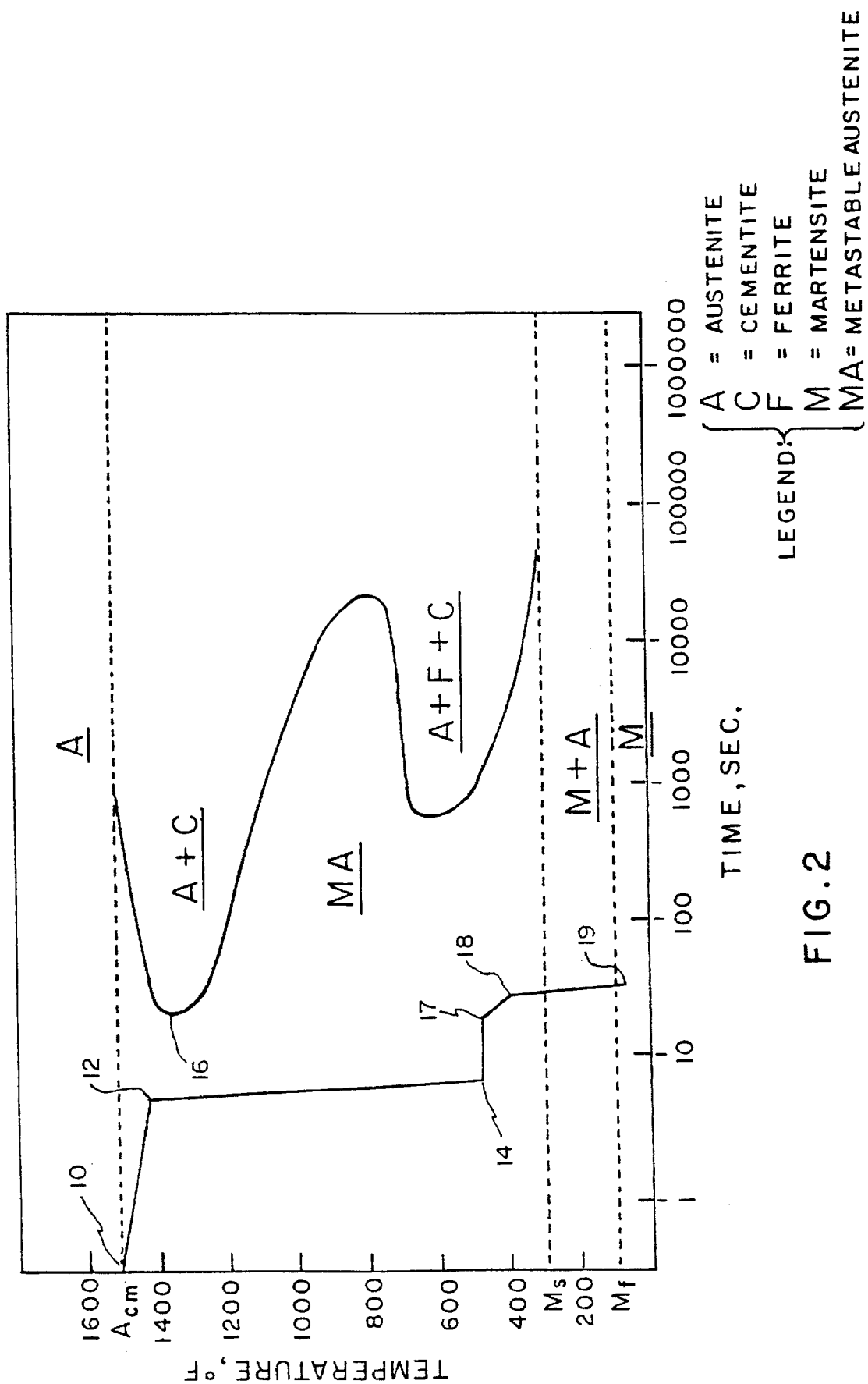
FIG. 2 is a Time-Temperature-Transformation (T-T-T) Diagram of a typical and preferred alloy, 3Ni-1Cr steel, used for gear fabrication according to the invention.

As mentioned above, the present invention eliminates the grinding operation to provide a microstructurally improved gear tooth surface as will now be described. An important part of this invention is to select a carburizing grade steel, such as carburized nickel-chromium steel, which has a transformation curve with a metastable austenitic condition just above the martensitic range for a period of time sufficiently long to allow shaping of the gear teeth surfaces. There is shown in FIG. 2, the time-temperature-transformation chart for nickel-chromium steel carburized to about 1.0% surface carbon. The carburized nickel-chromium steel is commonly used for manufacturing high performance gears in the aerospace industry. The time-temperature-transformation curves show the times required for austenite to start and to complete transformation at each temperature. Temperature is indicated along the ordinate and time on a logarithmic scale is indicated along the abscissa.

After the carburized gear is heated above its critical temperature to an initial temperature 10, or approximately 1350° F., to render it austenitic, it is rapidly isothermally quenched (marquenched) from point 12 to point 14 at a rate exceeding a critical cooling rate in a liquid medium such as a standard marquenching oil which is maintained just above the temperature at which martensite starts to form and metastable austenite is obtained. A critical cooling rate is defined by the slope of line 12-14 that avoids the nose 16 of the transformation curve where austenite and cementite start to form.

To allow the maximum time for mechanically operating on the surfaces of the workpiece 24 while in the metastable austenitic condition, the cooling step must terminate temporarily at a temperature just above the martensitic condition. In FIG. 2, the point 14 beginning a new temperature plateau ending at point 17 is shown positioned at about 450° F.

Shaping of gear teeth further in accordance with this invention employs a process which is performed between points 14 and 17 whereby gear swaging or rolling or other operations are used to shape the gear teeth by deforming the metastable austenitic carburized layer prior to and before its conversion to martensite. This occurs during a pre-transformation time interval at a temperature below that for recrystallization of austenite and just above the $M_s$ of the carburized layer. This process, to be described, presents a means of developing ultra high strength in the current carburized case hardened gears processed by the conventional heat treat processing.

Following the shaping operation, the gear is transferred to a quench station, as indicated in FIG. 2 by line 17-18. Final quench, preferably utilizing a pressurized gas stream, although a liquid is within the scope of the invention, is initiated at point 18 and is finalized at point 19 in the martensitic range.

The control subsystem 26 of the invention comprises both hardware and software supervising and controlling the thermomechanical operations. The control subsystem is under the primary supervision of a microprocessor 34. All of the functions necessary for the operation of the mechanical, environmental and thermal functions of the apparatus are controlled from this computer. The software used for these functions are preinstalled prior to operation and the algorithms contained in the software are considered part of the invention. The machine operator has a choice of operating each function of the machine separately or initiating a sequence of operations that will actually perform the thermomechanical forming operation. The software is constructed in such a way that each separate function cannot proceed until a requisite condition exists in the apparatus. The sequence of operations or "program" is generated by the operator using a series of two character commands which are stored for execution. The algorithm checks for sequences of operation that cannot be permitted. The program commands are transferred to a unit 36 for routing to the proper component in system 26. The unit 36 is concurrently a high speed signal conditioner, an I/O interface, and a digital/analog (D/A) converter.

Figure 7:
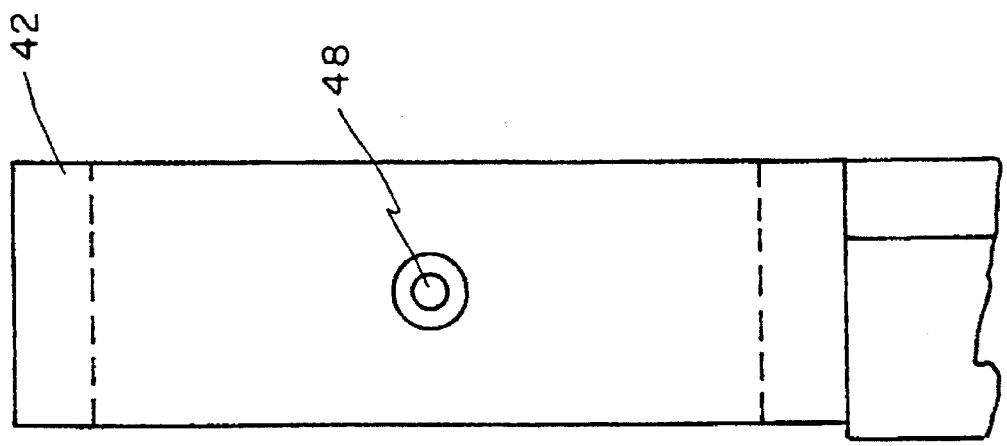
FIGS. 6 and 7 are detail front elevation and side elevation views, respectively, of an induction coil heater used for purposes of the invention.
Figure 6:
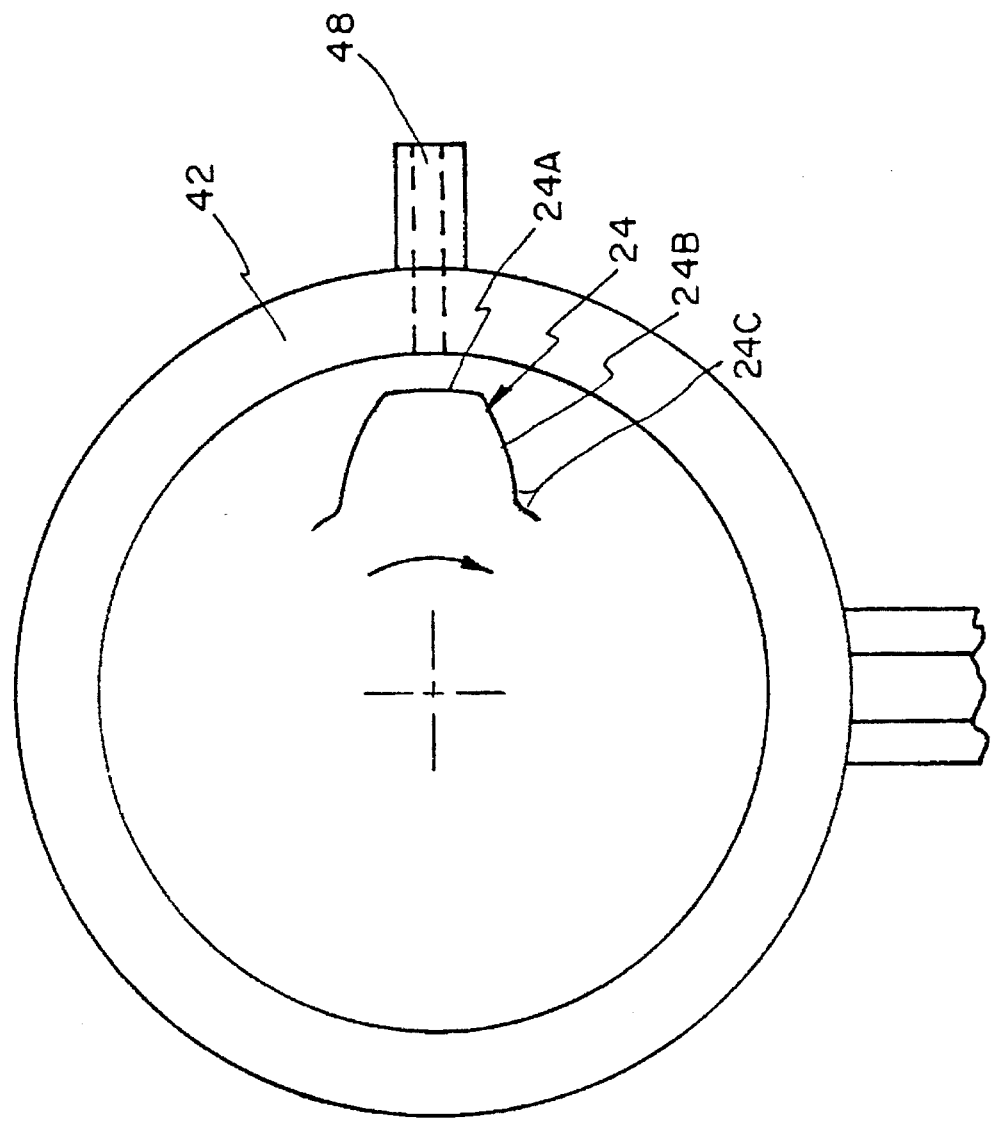
Figure 11:
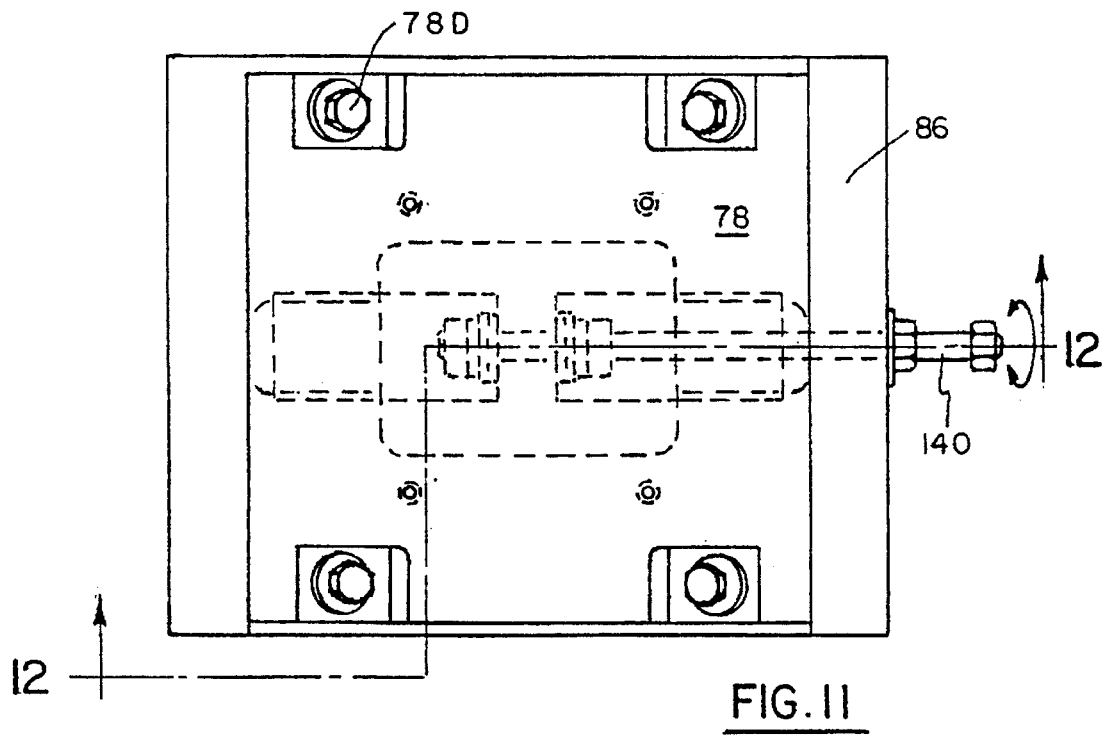
FIG. 11 is a detail top plan view of an in-plane adjustment mechanism utilized for purposes of the invention.
Figure 12A:
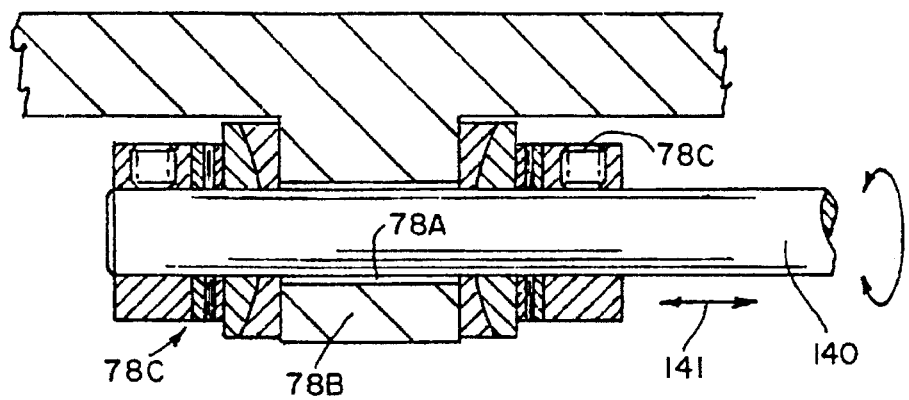
FIG. 12A is a detail enlarged view of certain parts illustrated in FIG. 12.
Figure 12:
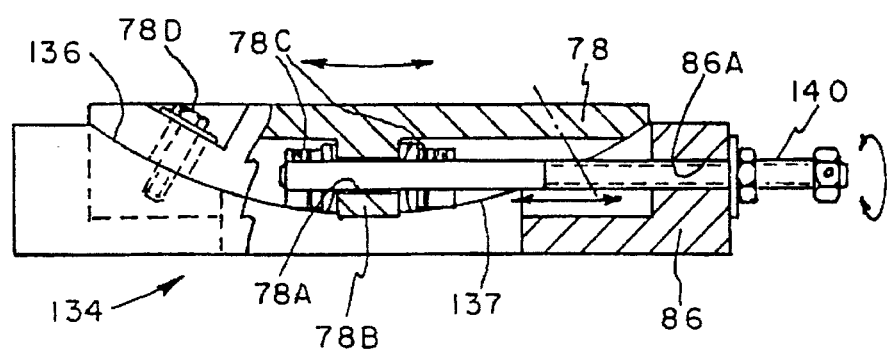
FIG. 12 is a cross section view taken generally along line 12—12 in FIG. 11.

During the operation of the system 20 (see FIG. 1), a control signal initializes all functions and sets up the individual subsystems and mechanisms for the operation to proceed. The process begins with a control signal from the interface 36 to an audio frequency (AF) control 38 which in turn energizes an AF work station 40 to provide an electric field to a toroidal-shaped, water cooled, induction coil heater 42 (see especially FIGS. 4, 6, and 7) into which the workpiece is temporarily positioned. The electrical field generated as the result of the operation of the induction coil may be 10 KHz, by way of example.

With particular reference to FIG. 2, which is a time-temperature-transformation diagram of a typical and preferred alloy used for gear fabrication, namely, 3Ni-1Cr steel, the workpiece 24 is heated to a temperature at which austenite is stable, whether it be a hypereutectic steel or a hypoeutectic steel. As heating proceeds, the temperature of the workpiece is monitored by means of an IR detector 44. An optical pyrometer which is an integral part of the IR detector performs this function, obtaining its information via a fiber optic link 46. Heat radiation from the workpiece is received through a sighting hole 48 in the coil 42 (see especially FIGS. 4, 6, and 7) which is transmitted to a high speed thermal signal processor 50. A commercially available signal processor which has been found suitable for this purpose is Vanzetti Systems Infrared Thermomonitor Model No. 3008 manufactured and sold by Vanzetti Systems of Stoughten, Mass.

The signal processor 50 must have a sufficient response time to enable it to distinguish the variations in temperature from top 24A to flank 24B to root 24C of each tooth (see FIG. 6), typically, of a 4 inch diameter, 8 diametral pitch gear as it is rotated at speeds approximately in the range of 80 to 100 RPM, in a manner to be described, during the induction heating operation. The processed signal is then transmitted to the high speed digital to analog (D/A) converter 36 and in turn to the microprocessor based computer 34 in which the preprogrammed algorithm determines whether the temperature profile of the gear has achieved the requisite condition before proceeding to the next processing step. At that point, a logic signal is returned to the D/A converter 36 which sends the appropriate control signal to the induction coil control system represented by the controller 38 and work station 40 to turn off the energy field. The induction heating is performed within the enclosed compartment 28 in a controlled environment of nitrogen, or argon, or other suitable inert gas to minimize the amount of decarburization and oxidation of the workpiece surface.

Figure 4C:
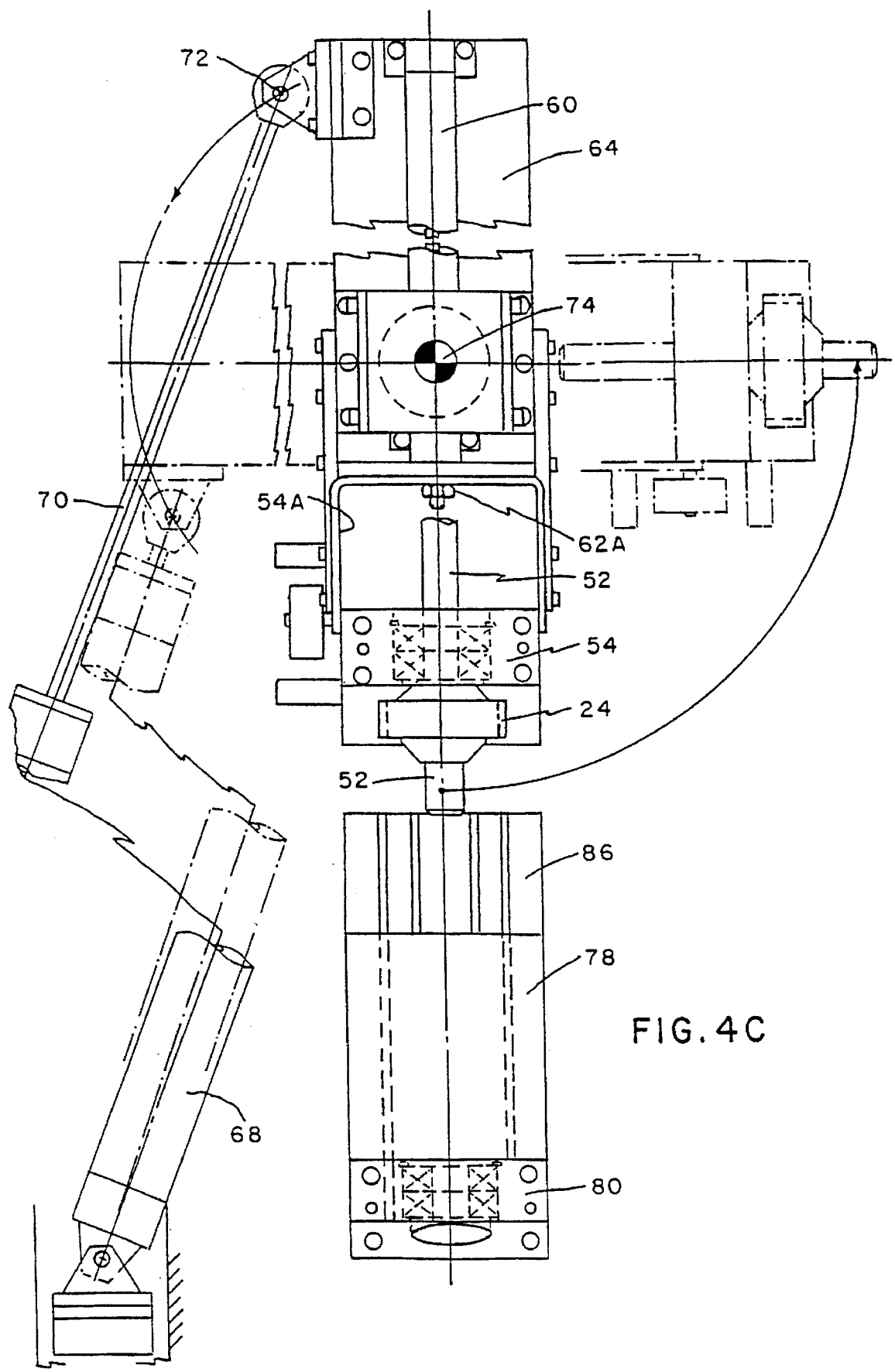
FIGS. 4C and 4D are detail end elevation views of certain parts illustrated in FIG. 4.
Figures 4D, 4E:
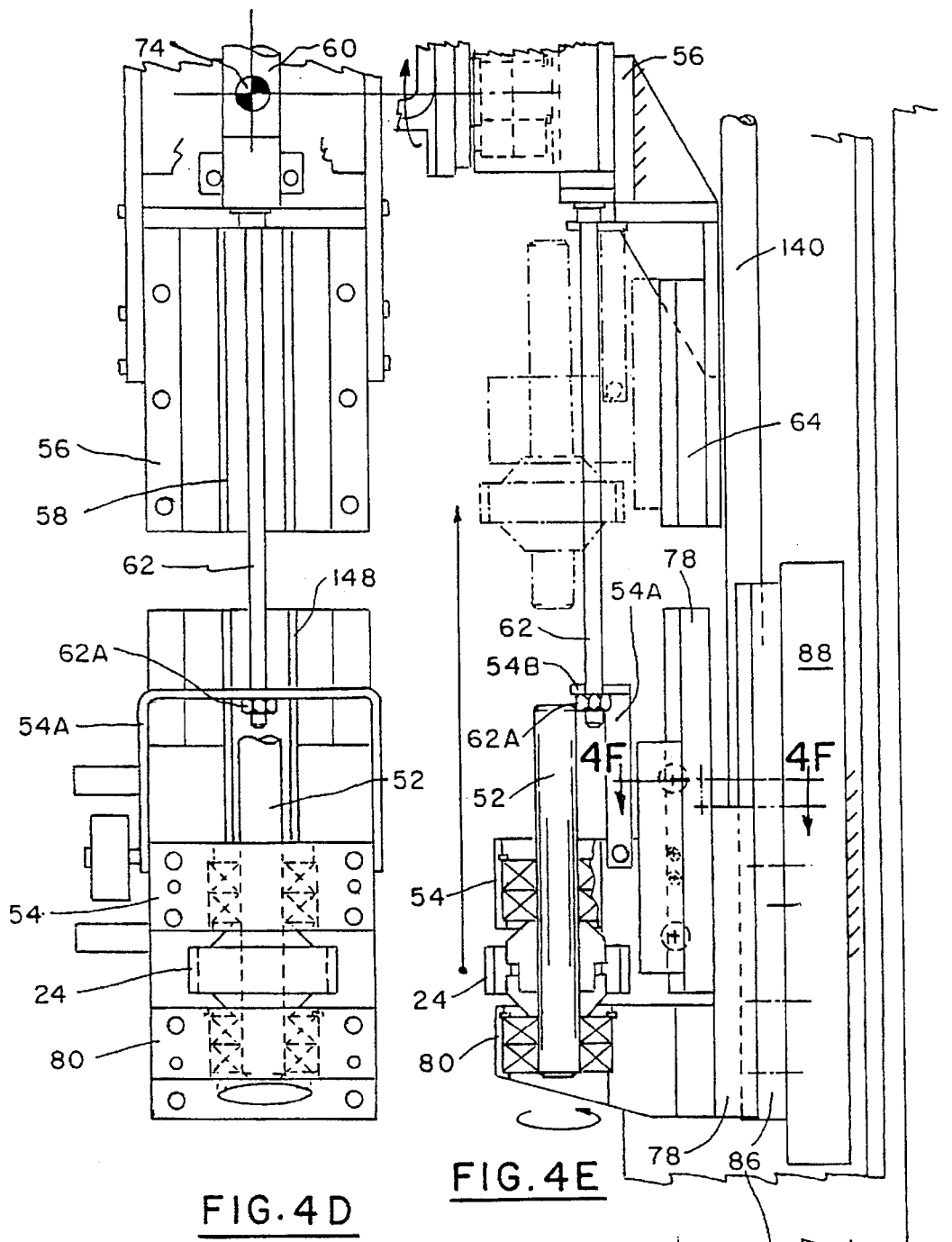
FIG. 4E is a detail side elevation view of parts illustrated in FIG. 4C.
Figure 4F:
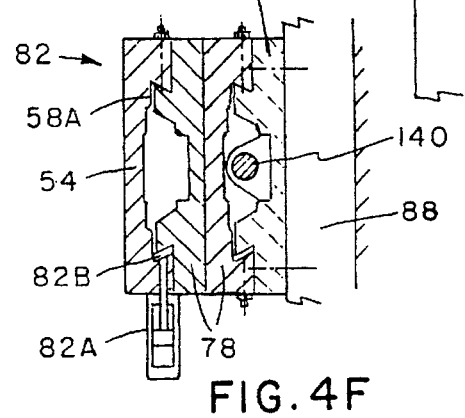
FIG. 4F is a cross section view taken generally along line 4D—4D.

The workpiece 24 is then rapidly transferred into the liquid working medium 32 where it is quenched to the metastable austenite condition. The mechanism for transferring the workpiece during the thermomechanical processing operation is best seen in FIG. 4 and its assoicated detail drawings, FIGS. 4A–4J. As with the induction heating operation, quenching of the workpiece 24 takes place in the controlled environment provided within the compartment 28.

A support spindle 52 on which the workpiece is suitably releasably secured is mounted for unitary rotation with an upper spindle bearing block 54 which is allowed to slide on the gear transfer slide plate 56 via dovetail slide ways 58 during the transfer operation. Induction heating takes place with the workpiece 24 in the horizontal or dashed line position (FIG. 4). For this operation, the workpiece 24 is extended on the support spindle 52 until it is positioned within the induction coil heater 42 (see especially FIG. 4A). Extension is accomplished by means of a workpiece transfer actuator 60 and its associated actuator rod 62 mounted on a transfer frame 64. After the workpiece is positioned within the induction coil heater 42, a friction drive wheel 66 engages the support spindle 52 to impart rotation to the workpiece during induction heating. A rotational speed in the range of 80 to 100 RPM has been found desirable for purposes of the invention.

When the induction heating cycle is completed, the workpiece is rapidly retracted from the induction coil. Retraction is accomplished by means of a lost motion mechanism which generally comprises a longitudinally extending bracket 54A, apertured transverse ear 54B, actuator rod 62, and an enlarged end 62A of the actuator rod. At one end, the bracket 54A is fixed to the bearing block 54 and the ear 54B is an integral part of its opposite end. The actuator rod extends slidably through the aperture ear 54B and terminates at the enlarged end 62A. In actual fact, the extreme end of the actuator rod 62 may be threaded and the enlarged end 62A may be a nut threadedly received on the apertured end to provide for adjustment of the lost motion mechanism. As seen in FIG. 4B, operation of the actuator 60 to retract the workpiece 24 from the heating zone of the induction coil heater 42 is effective to move the actuator rod 62 to the left (FIGS. 4A and 4B) until the enlarged end 62A engages the ear 54B, following which the bearing block 54 carrying the workpiece 24 and its spindle 52 is then slid to the left on the gear transfer plate 56.

The transfer frame 64 is then rotated to a vertical, or solid line, orientation (FIG. 4). This rotation is accomplished by a swivel actuator 68 operating through an actuator rod 70 whose extreme end is pivotally attached, as at 72, to the workpiece transfer frame 64 which is free to swing about a stationary axle 74. When the transfer frame 64 reaches the vertical orientation, the gear transfer actuator 60 is then operated to extend the workpiece 24 below the level 76 of the liquid working medium 32 within the vessel 30 where it is quenched to the metastable austenitic temperature. The transfer operation which includes withdrawal of the workpiece from the induction coil heater 42, swinging of the transfer frame 64 to the upright position, and immersion of the workpiece in the working medium 32 is performed in an extremely rapid manner, taking place over an interval of approximately two seconds.

The upper spindle bearing block 54 is then transferred via the transfer dovetail slide ways 58 (FIGS. 4 and 4D) to a gear support plate 78 so that the lower end of the workpiece support spindle 52 is captured within a lower spindle bearing block 80. This movement can best be seen with attention to FIGS. 4G–4J. A through-feed actuator 138, mounted on a top plate 139 (FIG. 3), imparts its motion to an actuator guide plate 86 by way of a through-feed rod connector 140. Selected operation of the actuator 138 serves to move the through-feed rod 140 in its longitudinal directions as indicated by a double arrow head 140A (FIG. 4G). After the workpiece transfer frame 64 has swung to the vertical position as indicated by solid lines in FIG. 4, the through-feed actuator 138 is operated to raise the through-feed rod 140, and with it the workpiece support plate 78 and the lower spindle bearing block 80 which is an integral part of the support plate 78. The actuator guide plate 86 is raised until the upper regions of the support plate 78 are proximate to the lower regions of the workpiece transfer frame 64. Thereupon, the actuator rod 62 operated by the workpiece transfer actuator 60 is advanced until its tip end engages the upper spindle bearing block 54. Continued operation of the actuator 60 is effective to transfer the bearing block 54 from the upper dovetail slideways 58 to lower dovetail slideways 58A provided on the workpiece support plate 78. The actuator 60 continues to extend the actuator rod 62 until the bearing block 54 has reached the position generally as indicated in FIG. 4J. The upper spindle bearing block 54 is then locked onto the gear support plate 78 by means of a dovetail locking mechanism 82 (see especially FIG. 4F) which includes hydraulically actuated gib locks.

As seen in FIG. 4F, the dovetail locking mechanism 82 comprises a hydraulic cylinder 82A which operates a gib 82B which, by its operation, eliminates the clearance between the sliding parts provided by the dovetail slideways 58A.

Through-feed motion, as represented by a double arrowhead 84 in FIG. 4, can then proceed by vertical translation of the actuator guide plate 86 on the in-feed translation plate 88. In-feed motion as represented by a double arrowhead 90 in FIG. 3 can proceed simultaneously by sliding of the in-feed translation plate 88 on in-feed slide guides 92 which are supported by in-feed slide bushings 94, all in a manner to be described below in greater detail.

Figure 5A:
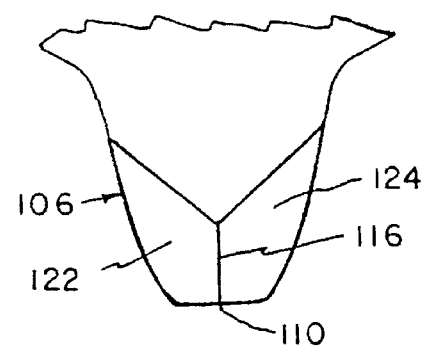
FIG. 5A is a detail side elevation view of the gear tooth illustrated in FIG. 5.
Figure 5:
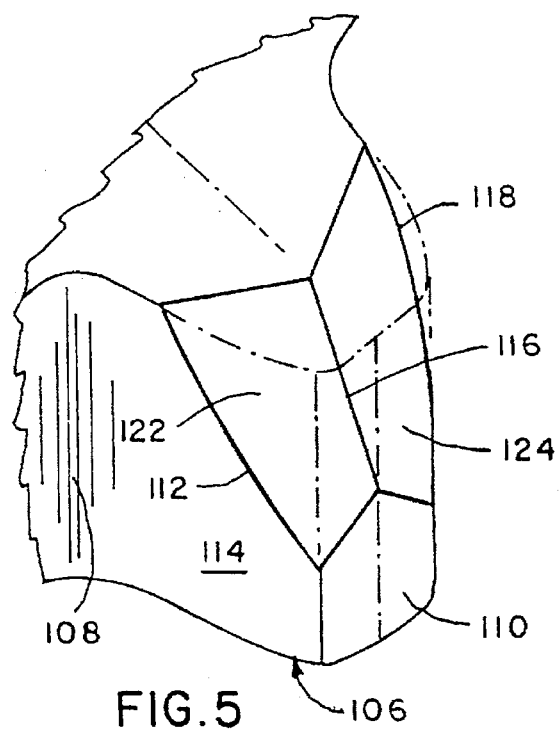
FIG. 5 is a detail perspective view of an individual tooth of an indexing gear utilized for purposes of the invention.
Figure 5B:
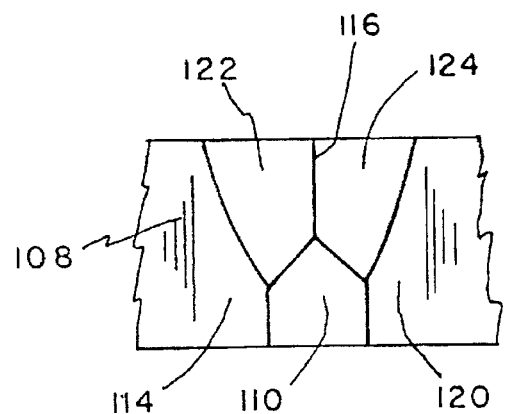
FIG. 5B is a detail top plan view of the gear tooth illustrated in FIG. 5.

At this point, the rotary actuator 96 which may be hydraulically operated can be activated to provide rotation, via an actuator shaft 98, to a coordinated rolling die 100 and indexing gear 102. Both the rolling die and the indexing gear are supported for rotation on an extension 98A of the actuator shaft 98 in a rolling die support frame 104. The axis of the workpiece 24 is positioned generally parallel to the plane of the axis of the rolling die 100 and of the indexing gear 102 so that meshing will occur as it passes through the indexing gear to synchronize or coordinate the rotation of the workpiece with that of the rolling die. In effect, the indexing gear 102 is a spur gear having modified teeth 106 (see FIGS. 5, 5A, and 5B). In FIG. 5, the outline of an original tooth is indicated by a combination of solid and dashed lines. As modified, indicated solely by solid lines, each tooth extends from a root 108 to a top land 110 and has been tapered on its lead side in a manner extending from a line 112 of departure from a flank 114 across a crest 116 to an opposite line of departure 118 from an opposite flank 120. This construction results in opposed tapered surfaces 122, 124 on the entry side of the teeth 106 which operate as cams to slightly rotate the workpiece 24 into synchronization with the rolling die 100. While other mechanisms could be used to move the workpiece into alignment with the rolling gear die 100 prior to their placement into a meshing relationship, the construction disclosed is a most economical one and is preferred.

The present invention provides for making appropriate adjustments should they be determined desirable to assure that an optimized gear will result from operation of the system 20. To this end, the mechanism of the gear processing subsystem 22 provides for both in-plane and out-of-plane adjustments which are provided relatively between the workpiece 24 and the rolling gear die 100.

The out-of-plane adjustment, that is, adjustment made outside of the plane defined by the axes of both the rolling gear die 100 and the workpiece 24, is provided by means of an adjustment mechanism 125 depicted in greater detail in FIGS. 8–10. By reason of this construction, the bifurcated rolling die support frame 104, when in the unlocked condition, is allowed to rotate around a pin 126. The pin 126 passes through the center of the die support frame 104 and through a load reaction frame 128 on which it is supported. Suitably mounted to an upper surface of the load reaction frame 128 is a cantilever plate 128A. The cantilever plate 128A has a pair of spaced finger members 128B, 128C which extend over the support frame 104 and define a recess 128D between them. An upper adjustment member 104A is also suitably attached to an upper surface of the support frame 104 and includes an them. An upper adjustment member 104A is also suitably attached to an upper surface of the support frame 104 and includes an integral head member 104B which extends upwardly into the recess 128D. Opposed adjustment screws 104C are threadedly received through the finger members 128B, 128C in opposed fashion to engage opposite sides of the head member 104B. Adjustment plate 128A is positioned above the level 76 (FIG. 4) of the liquid working medium 32. Out-of-plane adjustment as represented by angles 104D and 104E is accomplished by the appropriate operation of the adjustment screws 104C, screwing or unscrewing them in a unitary fashion to the extent desired. In order to secure the support frame 104 on the load reaction frame 128 when the desired out-of-plane adjustment has been achieved, a pair of locking bolts 128E which extend through arcuate grooves 128F and into threaded engagement with the support frame 104 are then tightened. This assures that the support frame 104 is locked against further additional undesired movement.

The in-plane adjustments, that is, adjustments made within the plane defined by the axes of both the rolling gear die 100 and the workpiece 24, are made on the workpiece support plate 78 with a locking mechanism 134 the control portions of which also extend above the level 76 (FIG. 4) of the liquid working medium 32. For purposes of the locking mechanism 134, the actuator guide plate 86 is provided with a hollowed-out region defined, in part, by an arcuate in-plane adjustment surface 136 which is congruent with a similar surface 137 on the workpiece support plate 78 opposite the surface on which the bearing blocks 54 and 80 are received. A terminal end of the through-feed rod 140 extends freely through a clearance hole 86A in the actuator guide plate 86, then through a clearance hole 78A in a projection integral with the support plate 78. Fasteners 78C of the ball joint variety serve to pivotably attach the free end of the connector rod 140 to the projection 78B. Longitudinal movement of the rod connector 140 as defined by double arrowhead 144 causes the gear support plate 78 to rotate normal to the radius of an in-plane adjustment surface 136, generally in the manner indicated by double arrowhead 141A. When the proper orientation of the workpiece support plate 78 relative to the actuator guide plate 86 has been achieved, a plurality of suitable fasteners 78D are then tightened to guard against the desired relative movement.

These mechanisms 130 and 134 permit the final adjustments of in-plane and out-of-plane alignments to be made when the system has reached thermal equilibrium. Once the adjustments have been made, the rolling die support frame 104 and the gear support plate 132 are locked in relative alignment. They remain so locked until it becomes desirable to make correcting adjustments at some future time.

Figure 13:
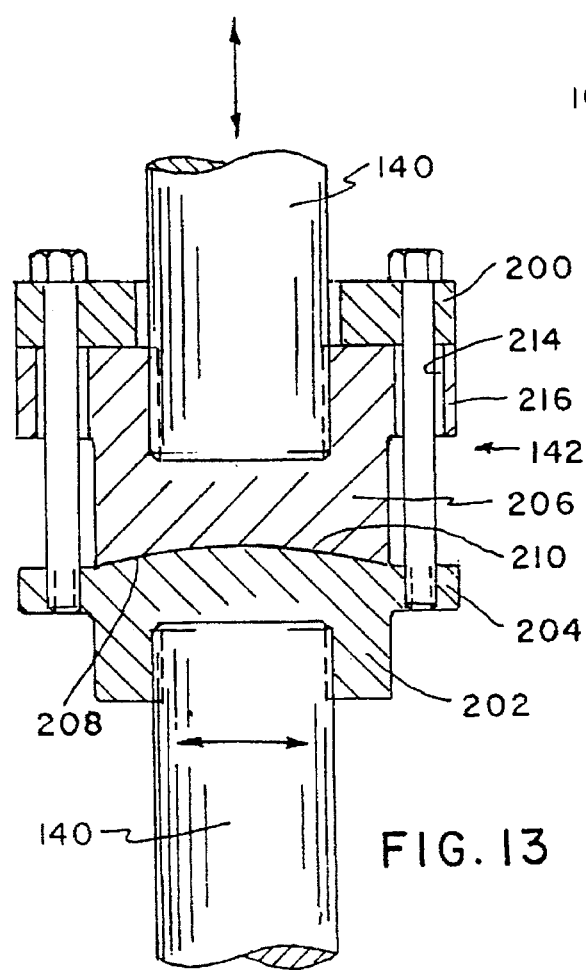
FIG. 13 is a detail elevation view, in section, of a component illustrated in FIG. 3.

As previously noted, through-feed motion is provided by a through-feed actuator 138, mounted on the top plate 139, which imparts its motion to the actuator guide plate 86 through the through-feed rod 140. To accommodate small incremental movements of the actuator guide plate 86 in the in-feed direction, a through-feed rod coupling 142 is provided to provide the through-feed rod 140 with a small amount of lateral flexibility. As seen particularly well in FIG. 13, the coupling 142 includes an upper ring member 200 which freely receives an end of the upper portion of the through-feed rod 140. A domed cap 202 with a peripheral flange 204 is fittingly received on an upper end of the lower through-feed rod 140 which matingly engages with an intermediate member 206 fittingly received on a lower end of the upper through-feed rod 140 and having a lower concave surface 208 slidably engaged with a concave surface 210 of the domed cap 202. The outer peripheries of the upper ring member 200 and of the domed cap 202 are joined by means of studs 212. The studs 212 pass freely through clearance holes 214 provided in an annular flange 216 of the intermediate member 206. It will be appreciated that as the actuator guide plate 86 moves in the direction of a double arrowhead 90 (see FIG. 3), the surfaces 208, 210 will be caused to slide slightly relative to one another and thereby provide the requisite lateral movement of the through-feed rod 140 without causing damage to the system.

The in-feed motion is produced from an in-feed actuator 150 also mounted on the top plate 139 and is transmitted to a sliding in-feed wedge 152 through an in-feed rod connector 154. The vertical motion of the sliding in-feed wedge 152 transmits force to the vertically fixed in-feed wedge 155 which in turn provides in-feed motion to the in-feed translation plate 88. The taper of the wedge mechanism may be, for example, 40:1. The friction of the sliding in-feed wedge 152 is minimized by the use of linear roller bearings 156 between it and the load reaction frame 128 and the in-feed wedge 155. The in-feed translation plate 88 is guided in the horizontal position by four in-feed slide guides 92. Two return springs 160 on the bottom in-feed slide guides 92 and extending between the load reaction frame 128 and the in-feed translation plate 88 provide a return force when the in-feed actuator 150 is withdrawn. The entire working assembly is mounted on a bed plate 162 which is attached to the top plate 139 by four spaced support columns 164.

The workpiece 24 is advanced axially along its lead direction at a preprogrammed rate of through-feed velocity, programmed as incremental position feedback. During this operation the pressure resisting entry of the workpiece is monitored by a through-feed load cell 166 connected between the through-feed actuator 138 and the workpiece 24 by the through-feed rod connector 140. If the through-feed resistance exceeds a preset limit further advance is prevented. Simultaneously the required in-feed position is provided by the in-feed actuator 150 to the in-feed translation plate 88. The in-feed motion determines the position of the workpiece axis relative to the rolling die axis, which is measured by a high resolution displacement transducer 168 located above the level 76 of the liquid working medium 32. The signal from this transducer is the primary feedback for maintaining the proper degree of engagement between die and workpiece. A high resolution displacement transducer 168 measures distance between the axes of the workpiece 24 and the rolling gear die.

In order to properly control the forming action, the amount of absolute displacement between the surfaces of the die teeth and the workpiece teeth must be controlled. This is accomplished by determining the point of meshing contact between the die and workpiece by detecting the increase in hydraulic pressure from a pressure sensor 170 in the rotary actuator 96. This signal is then returned to the microprocessor 34 via the I/O interface 36 where it is used to initialize the signal from the high resolution displacement transducer 168. The in-feed pressure is also monitored with an in-feed load cell 172 to determine if unexpected high in-feed loads are produced by the forming action. The microprocessor 34 will generate a signal to delay in-feed motion if the loads are beyond the pre-set limit. Alternatively, forming loads can be used as the primary control signal and the high resolution displacement transducer 168 can be used to monitor axial displacement. Both in-feed and through-feed processing signals including load, position and displacement are continually monitored and recorded on the hard drive of the computer for later analysis.

After the thermomechanical deformation is complete, the workpiece 24 is removed from the liquid working medium 32 and quenched with a stream of gas from a gas quench system 174. For this operation, the entire sequence previously described following heating of the workpiece and its subsequent immersion into the liquid working medium is re-traced.

The control system employs servovalve operated actuators in which the feedback signals from the through-feed loop is directed to a through-feed conditioner 176 and after conditioning directed to a through-feed servocontroller 178 where it is compared with the command signal to generate the error signal for the servovalve. Likewise the in-feed actuator 150 receives an error signal through the loop containing an in-feed signal conditioner 180 and an in-feed servocontroller 182. Command signals from the command signal generator 36 are alternately provided to each loop to effect operation simultaneously.

While preferred embodiments of the invention have been disclosed in detail, it should be understood by those skilled in the art that various other modifications may be made to the illustrated embodiments without departing from the scope of the invention as described in the specification and defined in the appended claims.

We claim:

1. A method of net shaping gear teeth of a high performance gear comprising the steps of:

(a) providing an inert atmosphere during the performance of all subsequent steps;

(b) heating a workpiece in the form of a near net shaped gear blank having carburized gear teeth surfaces above its critical temperature to obtain an austenitic structure throughout its carburized case;

(c) rapidly transferring the workpiece to a thermally controlled liquid working medium;

(d) submerging the workpiece in the liquid working medium and thereby isothermally quenching the workpiece at a rate greater than the critical cooling rate of its carburized case to a uniform metastable austenitic temperature just above the martensitic temperature transformation;

(e) holding the temperature of the workpiece in the uniform temperature range while rolling the gear teeth surfaces to a desired shape before martensitic transformation occurs; and (f) cooling the workpiece through the martensitic range for the carburized gear surfaces to harden the gear surfaces.

2. A method of net shaping gear teeth as set forth in claim 1 wherein the liquid working medium is an oil bath maintained at a temperature of approximately 450° F.

3. A method of net shaping gear teeth as set forth in claim 1 wherein the teeth of the workpiece are oversized compared to the desired final size of the net shaped gear.

4. A method of net shaping gear teeth as set forth in claim 1 wherein average shear strains up to approximately 1.5 are induced in the workpiece surfaces by the deformation process within the active profile.

5. A method of net shaping gear teeth as set forth in claim 1 wherein step (f) includes the step of:

(g) quenching the workpiece to the martensitic structure by means of an inert gas jet.

6. A method of net shaping gear teeth as set forth in claim 5 wherein the inert gas jet in step (g) is composed of nitrogen.

7. A method of net shaping gear teeth as set forth in claim 1 wherein step (b) includes the steps of:

(g) providing a toroidal shaped induction heater defining a heating zone;

(h) supporting the workpiece within the heating zone so as to be coaxial with the induction heater;

(i) rotating the workpiece on its axis of rotation within the heating zone;

(j) energizing the induction heater to impart heat to the heating zone;

(k) sensing and recording a plurality of temperatures of the workpiece as it rotates within the heating zone;

(l) calculating an average temperature of the workpiece from the plurality of temperatures sensed and recorded; and (m) deenergizing the induction heater when the average temperature of the workpiece reaches a thermal criteria value.

8. A method of net shaping gear teeth as set forth in claim 7 wherein step (k) includes the step of:

(n) viewing the outer peripheral profiled surface of the workpiece from a location external of the induction coil and along a line of sight extending through the induction coil and generally in the plane of the axes of the induction coil and of the workpiece.

9. A method of shaping gear teeth as set forth in claim 7 wherein step (k) includes the step of:

(n) sensing and recording for each tooth of the workpiece temperatures at one or more locations including the tip, root, and flank thereof;

wherein step (l) includes the step of:

(o) calculating average temperatures of the tips, roots and flanks of the teeth of the workpiece from the temperatures sensed and recorded; and wherein step (m) includes the step of:

(p) deenergizing the induction heater when the average temperatures calculated in step (o) reach thermal criteria values.

10. A method of heating a workpiece in the form of a near net shaped gear blank having a carburized surface in preparation for performing additional thermomechanical forming operations comprising the steps of:

(a) providing a toroidal shaped induction heater defining a heating zone;

(b) supporting the workpiece within the heating zone so as to be coaxial with the induction heater;

(c) rotating the workpiece on its axis of rotation within the heating zone;

(d) energizing the induction heater to impart heat to the heating zone;

(e) sensing and recording a plurality of temperatures of the workpiece as it rotates within the heating zone;

(f) calculating an average temperature of the workpiece from the plurality of temperatures sensed and recorded; and (g) deenergizing the induction heater when the average temperature of the workpiece reaches a predetermined value.

11. A method of heating a workpiece as set forth in claim 10 wherein step (e) includes the step of:

(h) viewing the outer peripheral profiled surface of the workpiece from a location external of the induction coil and along a line of sight extending through the induction coil and generally in the plane of the axes of the induction coil and of the workpiece.

12. A method of heating a workpiece as set forth in claim 10 wherein step (e) includes the step of:

(h) sensing and recording for each tooth of the workpiece temperatures at one or more locations including the top, root, and flank thereof;

wherein step (f) includes the step of:

(i) calculating average temperatures of the one or more locations of the teeth of the workpiece from the temperatures sensed and recorded in step (h); and wherein step (g) includes the step of:

(j) deenergizing the induction heater when the average temperatures calculated in step (i) reach predetermined values.

13. A method of heating a workpiece as set forth in claim 10 wherein step (e) includes the step of:

(h) sensing and recording the temperature of the top, flank, and root of each tooth of the workpiece;

wherein step (f) includes the step of:

(i) calculating average temperatures, respectively, of the top, flank, and root of the teeth of the workpiece from the temperatures sensed and recorded in step (i); and wherein step (g) includes the step of:

(j) deenergizing the induction heater when the average temperatures calculated in step (j) reach predetermined values.

14. A method of heating a workpiece as set forth in claim 10 wherein the additional thermomechanical forming operations comprise ausforming.

15. A method of heating a workpiece as set forth in claim 10 wherein step (e) includes the step of:

(h) continuously sensing and recording the temperature of the top and of the root of each tooth of the workpiece;

(i) continuously averaging the temperatures of the tops of the teeth of the workpiece;

(j) continuously averaging the temperatures of the roots of the teeth of the workpiece;

(k) comparing the temperatures detected in step (i) with a predetermined temperature;

(l) comparing the temperatures detected in step (j) with a predetermined temperature;

(m) deenergizing the induction heater when both the temperatures detected in step (i) and in step (j) are within a predetermined range of the predetermined temperature in each instance.

16. A method of heating a workpiece as set forth in claim 10 wherein step (d) includes the step of:

(h) pulsing the energy to the induction heater to thereby impart heat intermittently to the heating zone.

17. A method of heating a workpiece as set forth in claim 10 wherein step (e) includes the steps of:

(h) continuously sensing and recording the instantaneous root temperature of a randomly selected tooth of the workpiece;

(i) comparing the temperature detected in step (h) with a predetermined temperature; and (j) deenergizing the induction heater when the temperature detected in step (h) is within a predetermined range of the predetermined temperature.

18. A method of heating a workpiece as set forth in claim 10 wherein step (e) includes the steps of:

(h) continuously sensing and recording the average peak temperature of all the teeth of the workpiece;

(i) comparing the temperature detected in step (h) with a predetermined temperature; and (h) deenergizing the induction heater when the temperature detected in step (h) is within a predetermined range of the predetermined temperature.

19. A method of heating a workpiece as set forth in claim 10 wherein step (e) includes the steps of:

(h) continuously sensing and recording the temperatures of all of the teeth of the workpiece;

(i) comparing the minimum temperature detected in step (h) with a predetermined temperature; and (j) deenergizing the induction heater when the minimum temperature detected in step (h) is within a predetermined range of the predetermined temperature.

20. A method of heating a workpiece as set forth in claim 10
wherein the induction heater is an AF induction heater whose electric field operates in the range of approximately 10 KHz.

21. A method of net shaping gear teeth of a high performance gear comprising the steps of:
(a) rotating a rolling gear die having an outer peripheral profiled surface extending between generally parallel spaced lateral surfaces on a first axis in a controlled metastable austenitic environment;
(b) rotatably supporting a workpiece in the form of a near net shaped gear blank having an outer peripheral profiled surface extending between generally parallel spaced lateral surfaces on a second axis parallel to the first axis within the controlled metastable austenitic environment;
(c) advancing the workpiece along the second axis in a through-feed direction such that the outer peripheral profiled surface of the workpiece engages the rolling gear die and continues to advance until the workpiece is positioned substantially coextensive with the rolling gear die in the through-feed direction; and
(d) simultaneously with step (c) after the workpiece and the rolling gear die are substantially enmeshed, advancing the workpiece, within a plane containing the first and second axes, in an in-feed direction substantially perpendicular to the first axis until the outer peripheral surface of the workpiece engages the rolling gear die at a near net shaped center distance establishing an initial center distance between the first and second axes when the workpiece and the rolling gear die are initially engaged; and
(e) continuing to advance the workpiece in the in-feed direction by an additional increment of center distance thereby deforming the profile surfaces of each gear tooth resulting in final net shape of the teeth.

22. A method of net shaping gear teeth as set forth in claim 21
including the steps of:
(f) selectively adjusting the rolling die to assume a desired orientation about a third axis lying in a plane of the first and second axes and substantially perpendicular to the plane of the first and second axes;
(g) securing the rolling die in the desired orientation;
(h) selectively adjusting the workpiece to assume a desired orientation about a fourth axis lying generally in the plane of the workpiece and perpendicular to the plane of the first and second axes; and
(i) securing the workpiece in the desired orientation.

23. A method of net shaping gear teeth as set forth in claim 21 including the step of:
(f) coordinating rotation of the workpiece with the rolling gear die to enable enmeshed engagement of the outer peripheral profiled surface of the rolling gear die with the outer peripheral profiled surface of the workpiece during step (C).

24. A method of net shaping gear teeth as set forth in claim 21
including the steps of:
(f) sensing the force resisting entry of the workpiece in the through-feed direction; and
(g) interrupting step (c) when the force sensed in step (f) exceeds a predetermined value.

25. A method of net shaping gear teeth as set forth in claim 21
including the steps of:
(f) sensing the force resisting entry of the workpiece in the in-feed direction; and
(g) interrupting step (c) when the force sensed in step (f) exceeds a predetermined value.

26. A method of net shaping gear teeth as set forth in claim 21
wherein the workpiece has an outer peripheral profiled surface which is slightly oversized from that of a desired formed gear; and
wherein the rolling gear die has an outer peripheral profiled surface which is substantially similar to that of the desired shape.

27. A method of net shaping gear teeth as set forth in claim 21
including the step of:
(f) rotatably supporting on the first axis in side by side relationship with the rolling gear die an index gear having a lead in cam surface; and
wherein step (c) includes the step of:
(g) advancing the workpiece along the second axis in the through feed direction such that the outer peripheral surface of the workpiece first engages the lead in cam surface, then the rolling gear die.

28. A method of net shaping gear teeth as set forth in claim 21
including the steps of:
(f) sensing the force resisting rotation of the rolling gear die; and
(g) interrupting step (a) when the force sensed in step (f) exceeds a predetermined value.

29. A method of net shaping gear teeth as set forth in claim 23
wherein step (f) includes the steps of:
(g) rotating on the first axis adjacent the rolling gear die and together with the rolling gear die an indexing gear having an outer peripheral profiled surface extending between generally parallel spaced lateral surfaces and having a modified lead-in surface;
(h) advancing the workpiece along the second axis in a through-feed direction such that the outer peripheral profiled surface of the workpiece is cammed into meshing engagement with the outer peripheral profiled surface of the rolling gear die.

30. A method of net shaping gear teeth of a high performance gear comprising the steps of:
(a) rotatably supporting on its axis a workpiece in the form of a near net shaped gear blank having carburized gear teeth surfaces;
(b) while rotating the workpiece, heating it within an inert atmosphere above its critical temperature in a toroidal shaped induction heater to obtain a metastable austenitic structure throughout its carburized case;
(c) sensing the temperature of the carburized case of the workpiece as it rotates within the heating zone;
(d) deenergizing the induction heater when the average temperature of the carburized surfaces reaches a predetermined value;
(e) rapidly withdrawing the workpiece from the induction heater and in a swinging movement, re-orienting the workpiece to a position spaced from a liquid working medium;

(f) rapidly quenching the workpiece at a rate greater than the critical cooling rate of its carburized case to a uniform metastable austenitic temperature just above the martensitic temperature transformation;

(g) holding the temperature of the gear blank in the uniform temperature range while rolling the gear teeth surfaces to a desired shape before martensitic transformation occurs; and (h) cooling the gear through the martensitic range for the carburized gear surfaces to harden the gear surfaces.

31. Apparatus for net shaping gear teeth of a high performance gear comprising:

enclosure means providing an inert atmosphere during the performance of all operations performed on a workpiece;

means for heating the workpiece in the form a near net shaped gear blank having carburized gear teeth surfaces above its critical temperature to obtain an austenitic structure throughout its carburized case;

first quenching means including a thermally controlled liquid working medium for receiving the workpiece for cooling the workpiece at a rate greater than the critical cooling rate of its carburized case to a uniform metastable austenitic temperature just above the martensitic temperature transformation;

means for rolling the gear teeth surfaces to a desired outer peripheral profiled shape while holding the temperature of the workpiece in the uniform metastable austenitic temperature range;

second quenching means for cooling the workpiece through the martensitic range for the carburized gear surfaces to harden the gear surfaces; and transfer means for rapidly transferring the workpiece from a first position whereat the workpiece is proximate said heating means to a second position whereat the workpiece is positioned proximate to said controlled liquid working medium.

32. Apparatus as set forth in claim 31 wherein said first quenching means includes an oil bath maintained at a temperature of approximately 450° F.

33. Apparatus as set forth in claim 31 wherein said heating means includes:

a toroidal shaped induction heater defining a heating zone; and means for energizing said induction heater to impart heat to the heating zone; and including:

support means rotatably mounting the workpiece proximate to and aligned with the heating zone;

actuator means for selectively moving the workpiece between a retracted position displaced from said heating zone and an advanced position within the heating zone; and drive means for rotating the workpiece in the heating zone.

34. Apparatus as set forth in claim 31 wherein said heating means includes:

a toroidal shaped induction heater defining a heating zone; and means for energizing said induction heater to impart heat to the heating zone; and wherein said transfer means includes:

an elongated workpiece transfer frame;

a first bearing block longitudinally movable along said transfer frame;

a workpiece support spindle rotatably mounted on said first bearing block;

pivot means mounting said transfer frame for swinging movement between a substantially horizontal position whereat said workpiece support spindle is positioned proximate to and aligned with the heating zone and a substantially vertical position whereat said workpiece support spindle is positioned proximate to said controlled liquid working medium.

35. Apparatus as set forth in claim 34 including:

swivel actuator means for selectively swinging said transfer frame between said horizontal position and said vertical position.

36. Apparatus as set forth in claim 34 including:

workpiece actuator means for selectively moving the workpiece between a retracted position displaced from said heating zone and an advanced position within the heating zone when said transfer frame is in the horizontal position, and for selectively moving the workpiece between a raised position above the level of said liquid working medium and a lowered position immersed in said liquid working medium.

37. Apparatus as set forth in claim 31 lower workpiece support means movable from a lowered position immersed in said controlled liquid working medium to a raised position proximate to and aligned with said transfer means when said transfer means assumes the second position;

upper support means for supporting the workpiece on said transfer means; and workpiece transfer actuator means for transferring the workpiece to said lower workpiece support means.

38. Apparatus as set forth in claim 31 wherein said transfer means includes:

an elongated workpiece transfer frame;

a first bearing block longitudinally movable along said transfer frame;

a workpiece support spindle rotatably mounted on said first bearing block;

pivot means mounting said transfer frame for swinging movement between a substantially horizontal position whereat said workpiece support spindle is positioned proximate to and aligned with the heating zone and a substantially vertical position whereat said workpiece support spindle is positioned proximate to said controlled liquid working medium; and including:

lower workpiece support means movable from a lowered position immersed in said controlled liquid working medium to a raised position proximate to and aligned with said transfer means when said transfer means assumes the vertical position; and workpiece transfer actuator means for transferring the workpiece to said lower workpiece support means.

39. Apparatus as set forth in claim 38 including:

through-feed actuator means for moving said lower workpiece support means between the lowered position and the raised position.

40. Apparatus as set forth in claim 39 wherein said lower workpiece support means includes:

an actuator guide plate;

a workpiece support plate; and a second bearing block integral with said workpiece support plate; and locking means for selectively fixing said workpiece support plate to said actuator guide plate.

41. Apparatus as set forth in claim 40 wherein said through-feed actuator means includes:

a through-feed actuator;

a through-feed rod operably connected to said through-feed actuator; and a through-feed rod coupling pivotably connecting said through-feed rod and said actuator guide plate.

42. Apparatus as set forth in claim 31 wherein said means for rolling the gear teeth surfaces includes:

a rolling gear die having an outer peripheral profiled surface meshingly engageable with the outer peripheral profiled surface of the workpiece;

a support frame mounting said rolling gear die for rotation on an axis substantially parallel to an axis of the workpiece; and rotary actuator means for rotating said rolling gear die on the first axis.

43. Apparatus as set forth in claim 31 wherein said second quenching means includes a gas quench system for directing a pressurized stream of inert gas onto the workpiece.

* * * * *